C. D. GOLDEN.
COLLAPSIBLE CART.
APPLICATION FILED AUG. 29, 1911.
1,066,489.
Patented July 8, 1913.
2 SHEETS—SHEET 2.
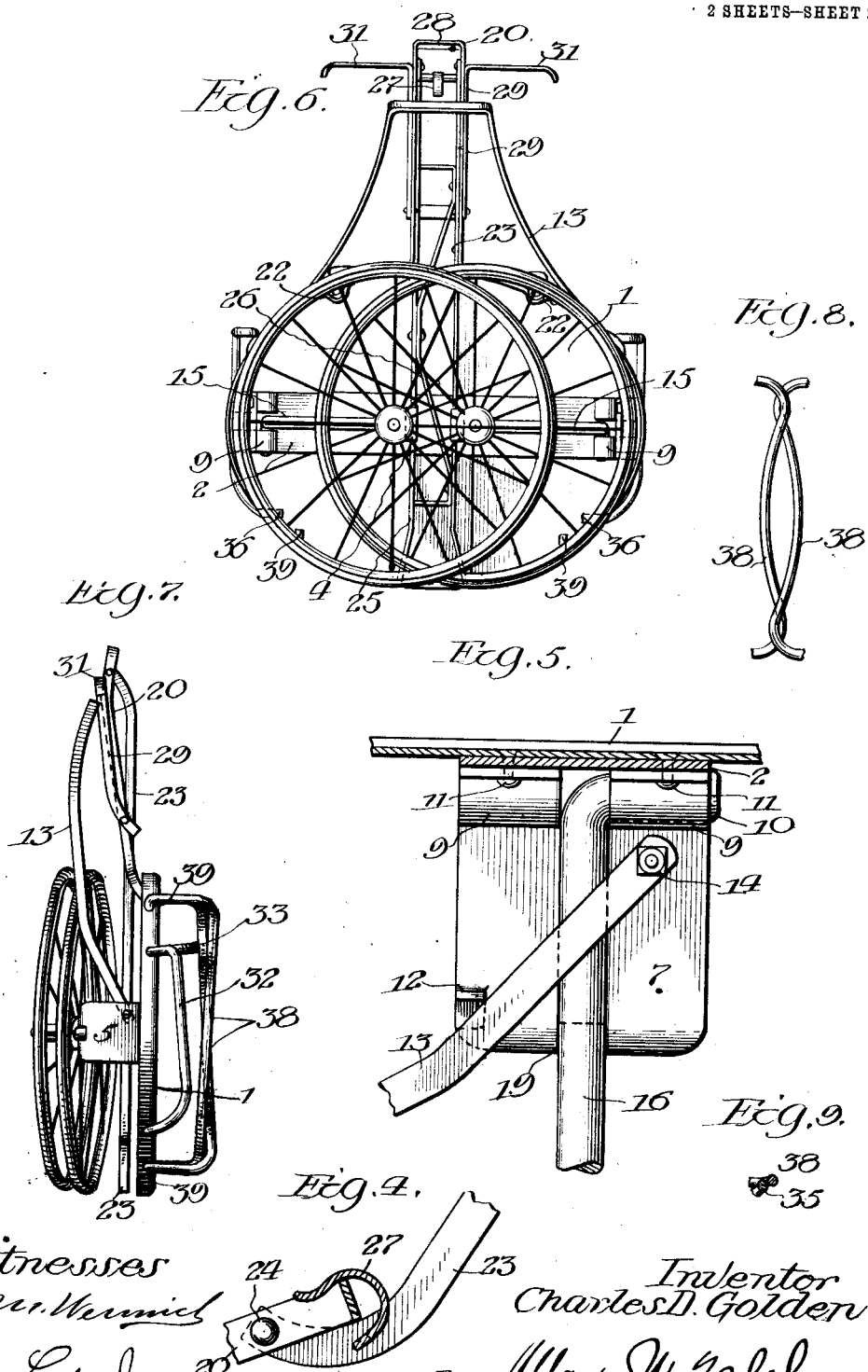

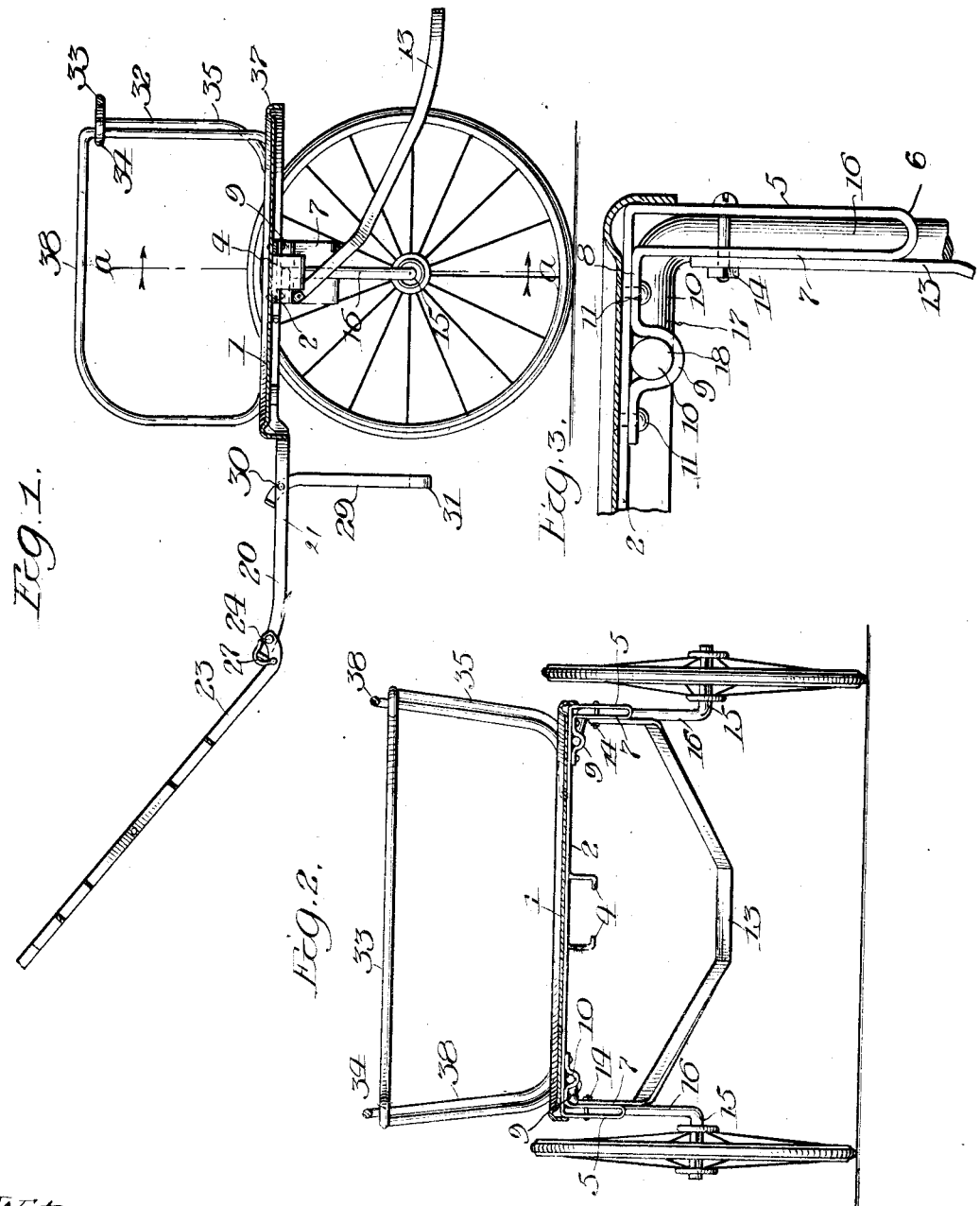
C. D. GOLDEN.
COLLAPSIBLE CART.
APPLICATION FILED AUG. 29, 1911.
1,066,489.
Patented July 8, 1913.
2 SHEETS—SHEET 1.
Witnesses
Inventor
Charles D. Golden
by Max W Zabel
Atty.

UNITED STATES PATENT OFFICE.

CHARLES D. GOLDEN, OF CHICAGO, ILLINOIS.

COLLAPSIBLE CART.

1,066,489.    Specification of Letters Patent.    Patented July 8, 1913.

Application filed August 29, 1911. Serial No. 646,648.

*To all whom it may concern:*

Be it known that I, CHARLES D. GOLDEN, a citizen of the United States, residing at Chicago, in the county of Cook and State of Illinois, have invented a certain new and useful Improvement in Collapsible Carts, of which the following is a full, clear, concise, and exact description, reference being had to the accompanying drawings, forming a part of this specification.

My invention relates to collapsible carts and has for its object the provision of a new and improved structure which in its preferred form may be entirely constructed of metal and which has new and simple structural features to promote the collapsibility thereof.

My invention contemplates improved constructional features of the handle thereof, contemplating a sectional handle to increase the degree of collapsibility.

My invention further contemplates improved foot rest features.

In the preferred form as shown herein, the seat portion is so arranged that the back and arm rests may be readily and easily collapsed toward the seat portion.

My invention in its preferred form also contemplates novel structural features for the mounting of the wheels, therefore to permit of their collapsing.

It will of course be understood that some or all of the features herein are capable of wide variation from the specific structure shown herein without departing from the spirit of the invention, and a number of the features are also adaptable for other uses. Herein, however, I will describe specifically one form which my invention may take, and this description will now be given in connection with the accompanying drawings illustrating one form of the invention, in which:

Figure 1 is a side view of my improved cart in its assembled form ready for use; Fig. 2 is a sectional view on lines *a*—*a* of Fig. 1; Fig. 3 is a detail of the constructional features involving the mounting of the wheel; Fig. 4 is a detail view of the sectional handle structure; Fig. 5 is a detail view of the wheel mounting mechanism; Fig. 6 is a bottom view of the device in collapsed form; Fig. 7 is a side view of the collapsed structure, and Figs. 8 and 9 are details of the locking mechanism employed.

Referring to the drawings, I show a seat portion 1 preferably of elliptical area to which a bar 2 of a substantially elongated U shape is fastened by means of rivets 11. At the center of this bar 2 substantially L shaped arms 4, 4 are punched out of the metal to form catches to hold that portion of the jointed handle which is bent backwardly when the structure is collapsed as will be explained later. The opposite ends of the bar 2 are constructed as more clearly shown in Fig. 3 in which the ends of the bar are bent at right angles to form an extension 5, a rounded portion 6, a reversed extension 7 and an extending portion 8 at right angles to the part 7, which part 8 is rounded at 9 to support the wheel carrying arm 10. The part 8 is fastened to the seat portion 1 by means of the rivets 11, 11 as illustrated. A tongue 12 as shown more clearly in Fig. 5 is also bent outwardly from the part 7 of the bar 2 to form a stop and catch for a bracket 13 which is pivotally secured to the downwardly extending arms of the bar 2 by means of the bolt 14. This bracket 13 serves as a rest or guide when the wagon is standing idle and when tilted backwardly so that said bracket touches the ground as will be apparent from an inspection of Fig. 1, although not shown in this position in that figure. This bracket 13 also serves to hold the wheel carrying members 10 in their vertical position when the structure is not collapsed. The wheel carrying arms 10 are each preferably of one piece and each have an axle portion 15, a vertically extending portion 16, a horizontal extension 17 and an extension 18 at right angles thereto which is held within the circular confines of the element 9 as is more readily apparent from an inspection of Fig. 3.

The arms 10 are rotatable about their bearing section 18 so that the wheels can be turned inwardly and laid against the lower portion of the seat 1 as more clearly shown in Figs. 6 and 7. Normally when the wheels are swung outwardly ready for operation as shown in Figs. 1 and 2 the bracket 13 is swung backwardly into the position shown in these figures and holds the arms 10 within slots 19 provided by cutting out a portion of the extensions 7 as more clearly shown in Fig. 5. When the bracket 13, referring for instance to Fig. 1, is moved in a clockwise direction into the position occupied in Fig. 6, then the wheels together with their arms 10 can be swung inwardly as shown in the collapsed views. The parts are of a springy nature so that they automatically catch in their limiting positions, either expanded or collapsed.

Extending forwardly from the seat portion 1 is an arm 20 consisting preferably of two side members 21, 21 which are bent in opposite directions and fastened by means of bolts 22, 22 to the said seat portion. To this arm 20 a handle 23 is pivotally mounted at 24, which handle also consists of two side members 25, 25 suitably separated by means of a distance piece 26. This handle carries a clasp 27 which is adapted to fit around the front portion 28 of the arm 20 and to hold the handle 23 in its upwardly extending direction, as shown in Fig. 1.

A foot-rest 29 shown more clearly in Fig. 6 is pivotally fastened at 30 to the arm 20 and has two diverging arms 31, 31 as shown. Now when the device is to be collapsed, the clasp 27 is unclasped and the handle 23 moved in a contra-clockwise direction, referring to Fig. 1, until it is engaged and held between the jaws 4, 4. Thereafter the bracket 13 is moved in a clockwise direction to release the wheel supporting arms 10, whereafter the two wheels and their arms are pivotally rotated about the portions 18 and swung into the position occupied in Figs. 6 and 7. The lower portion of the device is thus entirely collapsed. The back and arm rest portions are likewise collapsible. The back rest consists preferably of a heavy wire guard rail 32 having a horizontal portion 33 provided at its opposite extremities with a semi-circular portion 34, a substantially downwardly extending portion 35, and inwardly extending portions 36 which project through the overhanging portion 37 of the seat portion 1, about which sections 36 the said back rest 32 is rotatable so that it can be moved into its elevated position as shown in Fig. 1 or into its collapsed position as shown in Fig. 7. Two arm rests 38, 38 are provided substantially U-shaped and having at the free ends inwardly extending portions 39, 39 which likewise project through the overhanging portion 37 of the seat 1 so that these arm rests may be swung from their extended position of Fig. 1 into the collapsed position of Fig. 7.

It will thus be seen that the entire structure can be suitably collapsed into the position shown in Figs. 6 and 7 and can be moved into its extended position by merely rotating the various parts around their pivotal mountings. The semi-circular portions 34 of the back rest are so arranged that they exert a spring-like holding effort on the arm rests 38, 38 when the structure is in its extended condition so as to make a substantially safe device. The arm rests 38 when in their collapsed position interlock as shown more clearly in Figs. 7 and 8 on top of the seat and when in their open position (Fig. 2) the arm rests 38 and the rear rail 35 interlock as shown in Fig. 9 so as to lock themselves in position on account of the spring action between these various wire arms.

I have thus described one form of carrying out the various features of my invention, and I will set forth in the appended claims what I consider to be my invention.

I claim—

1. In a collapsible cart in combination with a seat portion, of a pair of wheels, wheel supporting arms pivotally associated with said seat portion, and pivotally mounted locking means for holding said wheel supporting arms in their distended position, said means extending backwardly and downwardly beyond the wheel supporting arms to serve as a stop in coöperation with the wheels when the said cart is not in motion.

2. In a collapsible cart, the combination with a seat portion of a strengthening member secured thereto, a pair of wheels, wheel supporting arms pivotally secured to said strengthening member, and means mounted on said strengthening member for holding said wheel carrying arms in their distended position, said means extending backwardly and downwardly beyond the wheel supporting arms to serve as a stop in coöperation with the wheels when the said cart is not in motion.

3. In a collapsible cart, the combination with a seat portion of a U-shaped strengthening member secured thereto, a pair of wheels, wheel supporting arms pivotally secured to said strengthening member, and means mounted on said strengthening member for holding said wheel carrying arms in their distended position.

4. In a collapsible cart, the combination with a seat portion of a U-shaped strengthening member secured thereto, a pair of wheels, wheel supporting arms pivotally secured to said strengthening member, looped portions provided in said strengthening member for pivotally holding said wheel supporting arms, and means mounted on said strengthening member for holding said wheel carrying arms in their distended position.

In witness whereof, I hereunto subscribe my name this 19th day of August A. D., 1911.

CHARLES D. GOLDEN.

Witnesses:
O. M. WERMICH,
HAZEL JONES.